United States Patent
Jia et al.

(10) Patent No.: US 12,231,869 B2
(45) Date of Patent: Feb. 18, 2025

(54) SPATIAL AUDIO IN VIRTUAL CONFERENCE MINGLING

(71) Applicant: Zoom Video Communications, Inc., San Jose, CA (US)

(72) Inventors: Zhaofeng Jia, Saratoga, CA (US); Qiyong Liu, Singapore (SG); Mengfan Zhang, Mountain View, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 185 days.

(21) Appl. No.: 17/976,417

(22) Filed: Oct. 28, 2022

(65) Prior Publication Data

US 2024/0147177 A1    May 2, 2024

(51) Int. Cl.
*H04S 7/00*  (2006.01)
*H04L 65/403*  (2022.01)
*H04S 3/00*  (2006.01)

(52) U.S. Cl.
CPC ............ *H04S 7/303* (2013.01); *H04L 65/403* (2013.01); *H04S 3/008* (2013.01); *H04S 2400/01* (2013.01); *H04S 2400/11* (2013.01); *H04S 2420/01* (2013.01)

(58) Field of Classification Search
CPC ...... H04S 7/303; H04S 3/008; H04S 2400/01; H04S 2400/11; H04S 2420/01; H04L 65/403
USPC ............................ 381/303, 1, 300, 304, 305
See application file for complete search history.

(56) References Cited

U.S. PATENT DOCUMENTS

| | | | | |
|---|---|---|---|---|
| 11,671,272 | B1* | 6/2023 | Farina | G06F 16/955 709/204 |
| 2011/0271192 | A1* | 11/2011 | Jones | G06F 3/0421 709/227 |
| 2023/0133265 | A1* | 5/2023 | Springer | H04N 7/147 348/14.03 |

* cited by examiner

*Primary Examiner* — Thjuan K Addy
(74) *Attorney, Agent, or Firm* — Kilpatrick Townsend & Stockton LLP

(57) ABSTRACT

One example method includes presenting, by a client device, a view of a virtual conference hosted by a virtual conference provider, the virtual conference including a plurality of participants, the client device associated with a participant of the plurality of participants, the view including a plurality of groupings of participants within a virtual conference area, each grouping associated with a different meeting or sub-meeting of the virtual conference; assign a location within the virtual conference area to the participant; receiving, at the client device from the conference provider, one or more audio streams associated with one or more audio sources within the plurality of groupings, the one or more audio streams provided by one or more remote client devices; determining a first location within the virtual conference area of a first audio source of the one or more audio sources; generating a plurality of spatialized audio streams based on the first location of the first audio source, the location of the indicator, and a first audio stream associated with the first audio source; and outputting the spatialized audio streams.

20 Claims, 13 Drawing Sheets

SPATIAL AUDIO IN VIRTUAL CONFERENCE MINGLING

FIELD

The present application generally relates to virtual conferencing and more specifically relates to spatial audio in virtual conference mingling.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
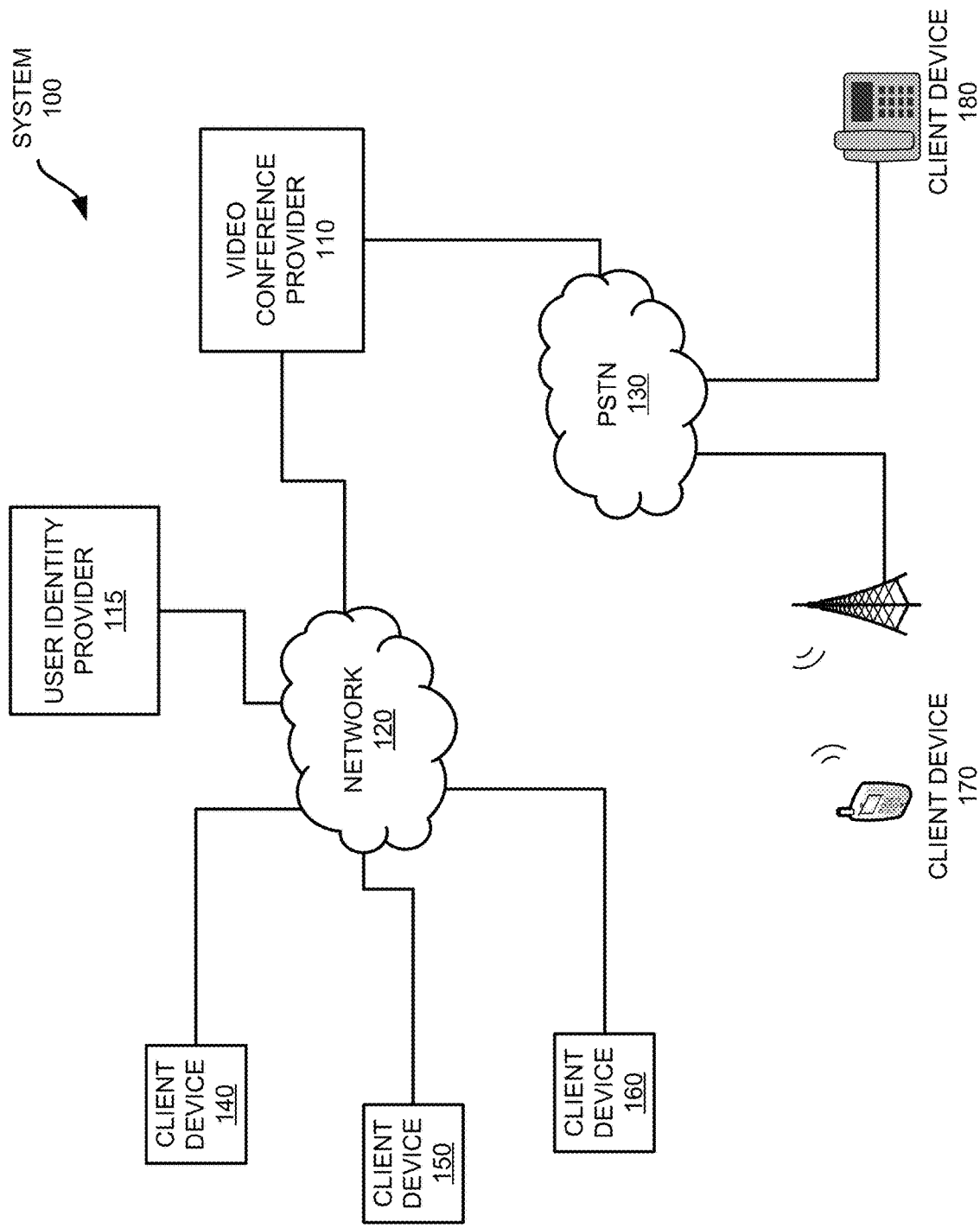
FIGS. 1-2 show example systems for spatial audio in virtual conference mingling.

Examples are described herein in the context of spatial audio in virtual conference mingling. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference, participants may engage with each other to discuss any matters of interest. Typically, such participants will interact in a virtual conference using a camera and microphone, which provides video and audio streams (each a "media" stream; collectively "multimedia" streams) that can be delivered to the other participants by the virtual conference provider and be displayed via the various client devices' displays or speakers. In a typical meeting, users will be presented with views of different participants in windows within a graphical user interface ("GUI"). As different participants speak, their participant window may be highlighted, change size or position, or otherwise be emphasized so that others in the virtual conference know which participant is talking. However, video conferences may provide other ways of presenting the participants within the virtual conference.

For example, a virtual conference may be established and presented in a less structured manner than discussed above. For example, when participants join a virtual conference using virtual conference client software (or "client software"), they may be placed within a virtual conference area and may be represented by an avatar, such as a static image of the participant or a video feed or "bubble." Within the virtual conference area, the different participants may move their avatars to different locations to speak with different participants. This may cause different sub-meetings or breakout rooms to be created from the main virtual conference. However, because the various participants can see the other participants in the virtual conference area, they can see the different groups of participants forming. Thus, they can decide to navigate near a group to join that group.

To provide a more immersive experience in this kind of a mingling environment, as the participant navigates within the virtual conference area, they may receive audio from the different groups of participants who are talking. This can emulate a user walking within a conference room or space where they could ordinarily hear the different conversations. To make this experience more realistic, the user may hear audio from these different groups of participants that is spatialized to provide a sense of distance and direction from the participant to the different groups in the virtual conference area. Thus, a group that appears to be to the left may be primarily output from the user's left speaker, and their relative volume or intelligibility may be reduced based on their distance from the speaker.

To provide the spatialized audio while mingling within the virtual conference area, the client software will receive audio streams from different participants within the virtual conference area as well as location information for those participants as well as for the user themself. The incoming audio streams from the different participants can then be processed by the client software based on the respective locations to generate corresponding spatialized audio streams, such as by using corresponding head-related transfer functions ("HRTFs"). These different spatialized audio streams can then be mixed with each other and output to the user. Thus, the audio from the different participants within the virtual conference area will sound as though they are coming from the different locations of the groups within the virtual conference area. In addition, as the user navigates within the virtual conference area, the spatialized audio streams will change to reflect the user's new position relative to the various other participants or groups of participants. As a result, the user will perceive the virtual conference area as a virtual conference space where they can fluidly mingle with other participants and feel as though they are present amongst a group of people.

This illustrative example is given to introduce the reader to the general subject matter discussed herein and the disclosure is not limited to this example. The following sections describe various additional non-limiting examples and examples of spatial audio in virtual conference mingling.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
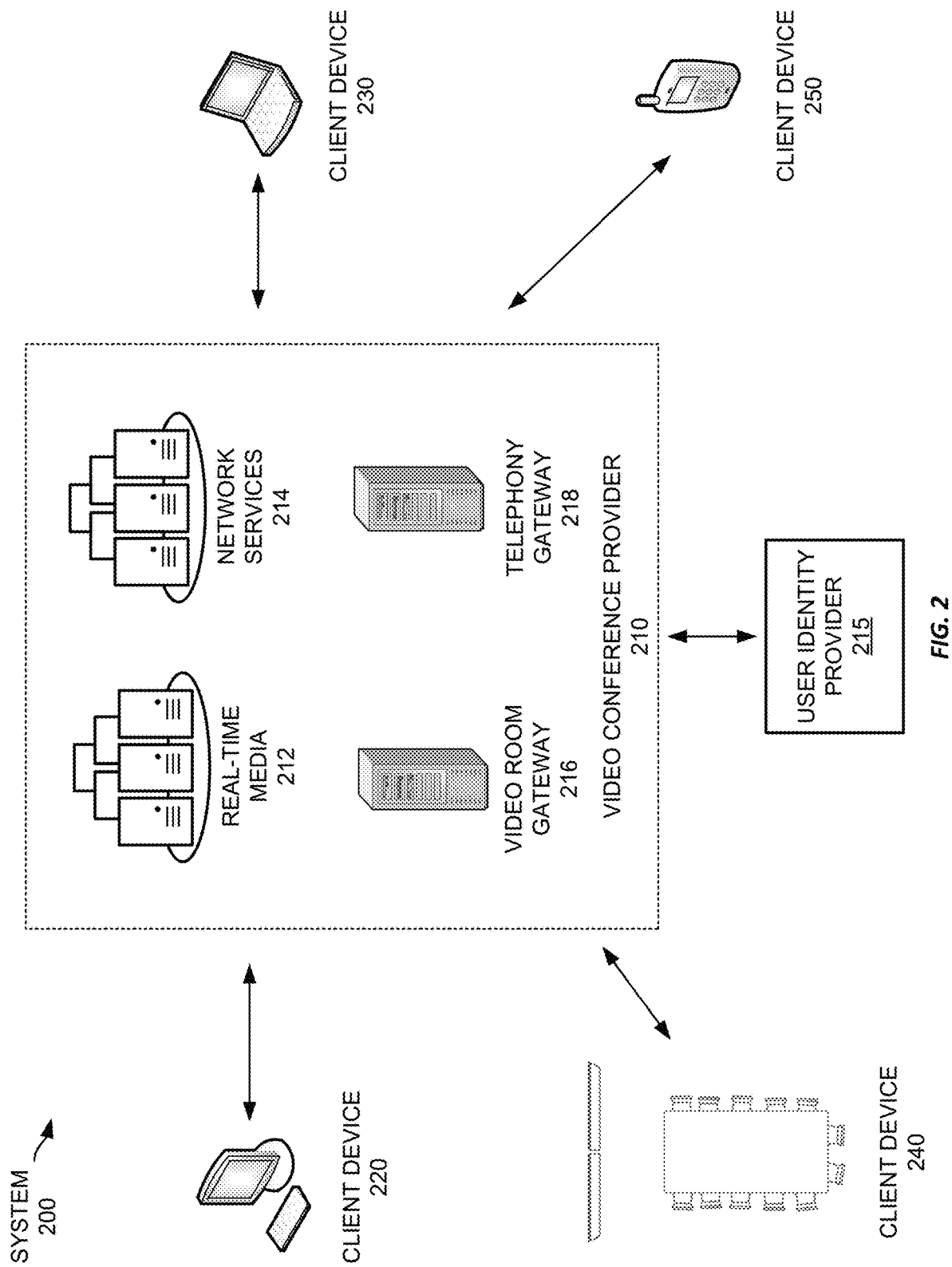

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
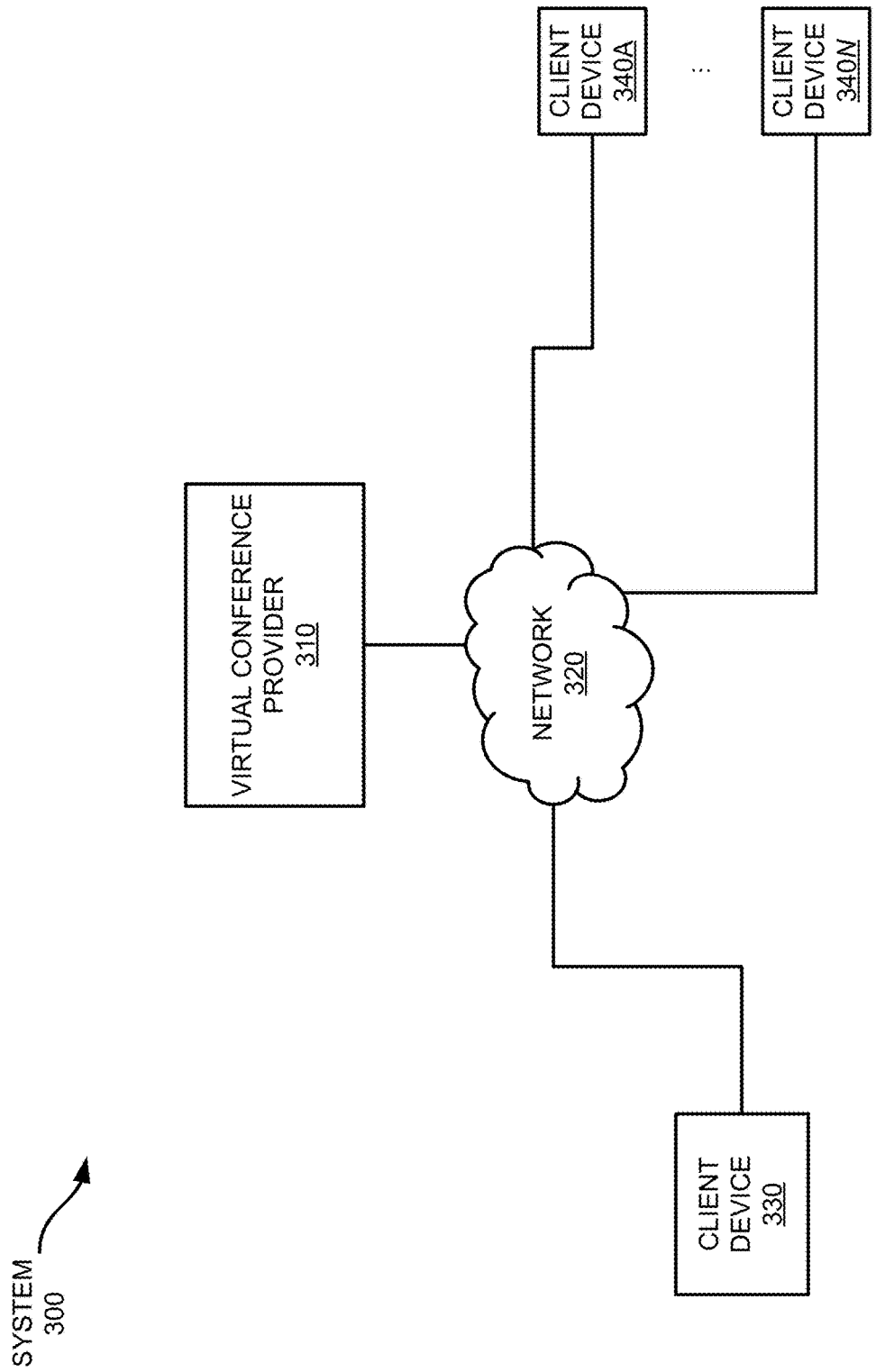
FIGS. 3A-3B show an example system for spatial audio in virtual conference mingling.
Figure 3B:
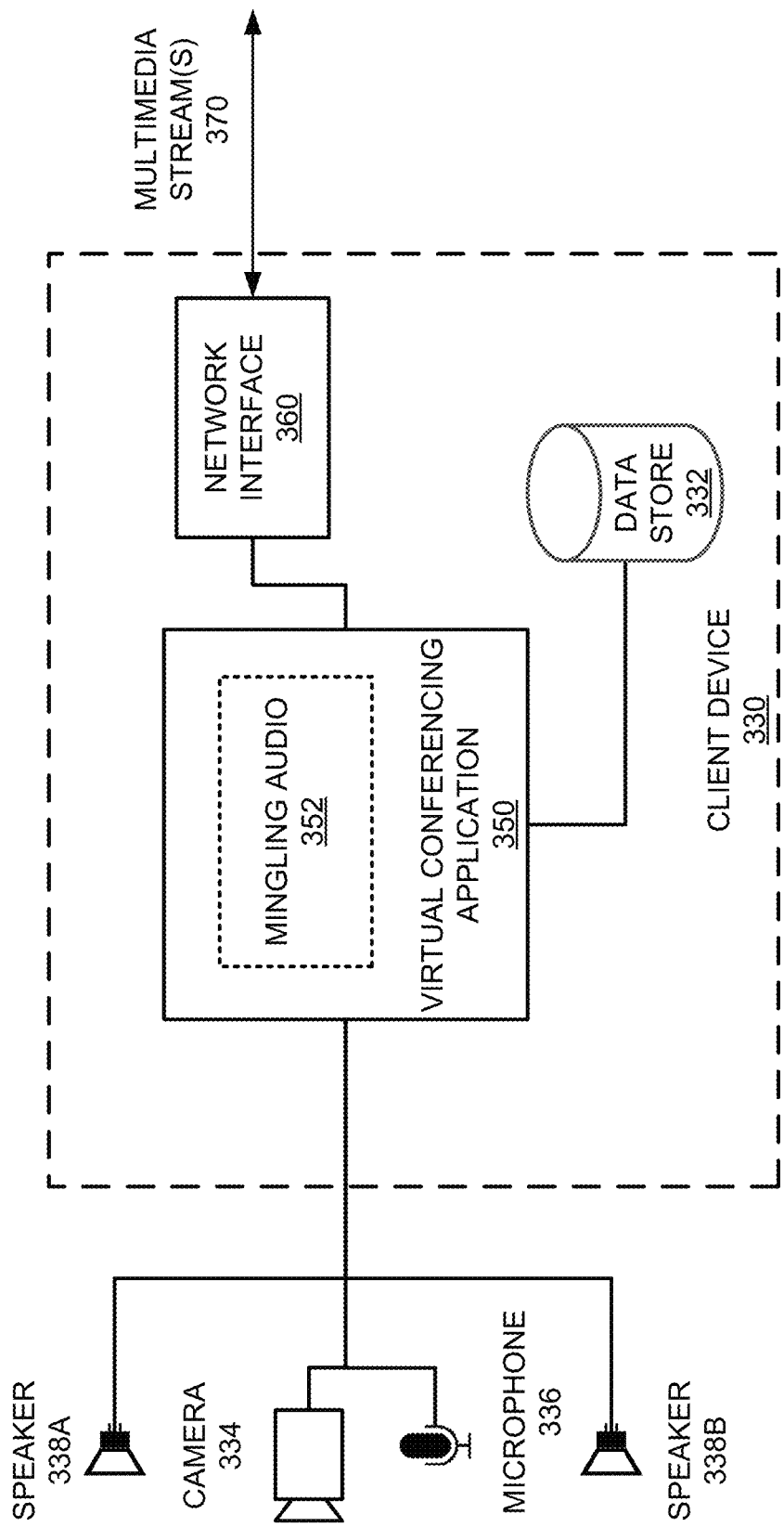

Referring now to FIGS. 3A-3B, FIG. 3A shows an example system 300 for spatial audio in virtual conference mingling. The system 300 includes a virtual conference provider 310, which can be connected to multiple client device 330, 340a-n via one or more intervening communication networks 320. In this example, the communications network 320 is the internet, however, any suitable communications network or combination of communications network may be employed, including LANs (e.g., within a corporate private LAN), WANs, etc.

Each client device 330, 340a-n executes virtual conference software that connects to the virtual conference provider 310 and joins a meeting. During the meeting, the various participants (using virtual conference software or "client software" at their respective client devices 330, 340a-n) are able to interact with each other to conduct the meeting, such as by viewing video feeds and hearing audio feeds from other participants, and by capturing and transmitting video and audio of themselves.

Client device 330, 340a-n may join virtual conferences hosted by the virtual conference provider 310 by connecting to the virtual conferences provider and joining a desired virtual conference, generally as discussed above with respect to FIGS. 1-2. Once the participants have joined the conference, they may interact with each other by exchanging audio and video feeds. In some cases where a virtual conference is reconfigured from a standard graphical layout to a virtual conference area within which participants may move around, the host, using client device 330 in this example, may select an option to change to a virtual conference area layout. Once the virtual conference is using the virtual conference area layout, the participants' client software presents an open virtual conference area within which avatars for each of the participants is displayed. The participants may then freely move their avatars within the virtual conference area to specifically talk to one or more people in a group, or they may move between different groups of people. To provide these groups, the video conference provider 310 creates sub-meetings for each of the groups, which participants may join by moving into a particular group or leave by moving away from the group.

In some examples, rather than providing an open virtual conference area in which a user may move their avatar, the virtual conference area may be provided as a scrollable list of available groups may be seen and heard. For example, the user may be presented with a horizontally oriented sequence of the different groups within the virtual conference. The audio from each group may be provided to the user based on the relative positioning of each group. Thus, a group centered on the user's display screen may sound as if they are directly in front of the user, while a group to the left or right side of the screen may sound as if they are to the left or right of the user. Alternatively, the groups may be arrayed in a circle on the screen with the user's virtual location at the center of the screen. Thus, groups may sound as if they are in front of the user, behind the user, or to the different sides, whether front or back, based on their respective locations. The user may then rotate the groups and perceive their changes in location based on the apparent source of the group's audio.

Referring now to FIG. 3B, FIG. 3B shows an example client device 330 from FIG. 3A. The client device 330 executes a software client, referred to as the virtual conferencing application 350 in this example. The virtual conferencing application 350 receives audio and video data from a microphone 336 and a camera 334, respectively, connected to the client device 330. During a virtual conference, the virtual conferencing application 350 encodes the received audio and video data and transmits them to the network as multimedia streams 370 using a network interface 360. In addition, the virtual conferencing application 350 receives multimedia streams 370 from the virtual conference provider, which were initially generated by other client devices, e.g., client device 340a-n, participating in the virtual conference.

In this example, the client device 330 is operated by the host of a virtual conference who configures the virtual conference to be in a mingling configuration using a virtual conference area. For example, the host may select an option when initially configuring the virtual conference, before inviting other participants. In other examples, the host may select an option during a virtual conference to create mingling conference using a virtual conference area.

After configuring the virtual conference to have a virtual conference area, the virtual conference provider 310 notifies each of the other participants' client software of the change and the GUIs presented by the client software changes to present the virtual conference area.

When configured to use a virtual conference area, participants may be presented as avatars within the virtual conference area or have virtual locations without being displayed as avatars. They may move around freely within the area if presented as avatars, or they may directly create group conversations or choose from existing group conversations by creating or selecting conversation blocks in the virtual conference area. In both scenarios, each participant has an associated location within the virtual conference area. They can then move within the virtual conference area if presented as avatars or directly select or unselect different conversation blocks to join or leave different groups to participate in those groups' discussions. However, while the virtual conference area provides a more realistic "mingling" appearance for the conference participants, the virtual conferencing application 350 also uses its mingling audio system 352 to provide spatialized audio to the participant so that they feel as if they are interacting within different groups of people dispersed within a room, such as in a typical live networking event. The spatialized audio provides audio streams to the participant that seem to come from the different groups based on the participants' position in the virtual conference area with respect to the different groups.

To provide spatialized audio, the virtual conferencing application receives multimedia streams 370 from the virtual conference provider 310. The audio streams are then provided to the mingling audio system 352 of the virtual conferencing application. In addition, the virtual conferencing application 350 receives the positions of the other participants or the positions of the conversation blocks of the other participants within the virtual conference area, which allows the virtual conferencing application 350 to display participants' avatars or conversation blocks within the virtual conference area. These locations, however, can also be provided to the mingling audio system 352, which can use the locations and corresponding audio streams to generate spatialized audio streams that will sound as though they are originating from the respective positions of the participants within the virtual conference area. Thus, the participant will feel as though they are actually moving within a physical space and hearing the conversations occurring around them.

Figure 4:
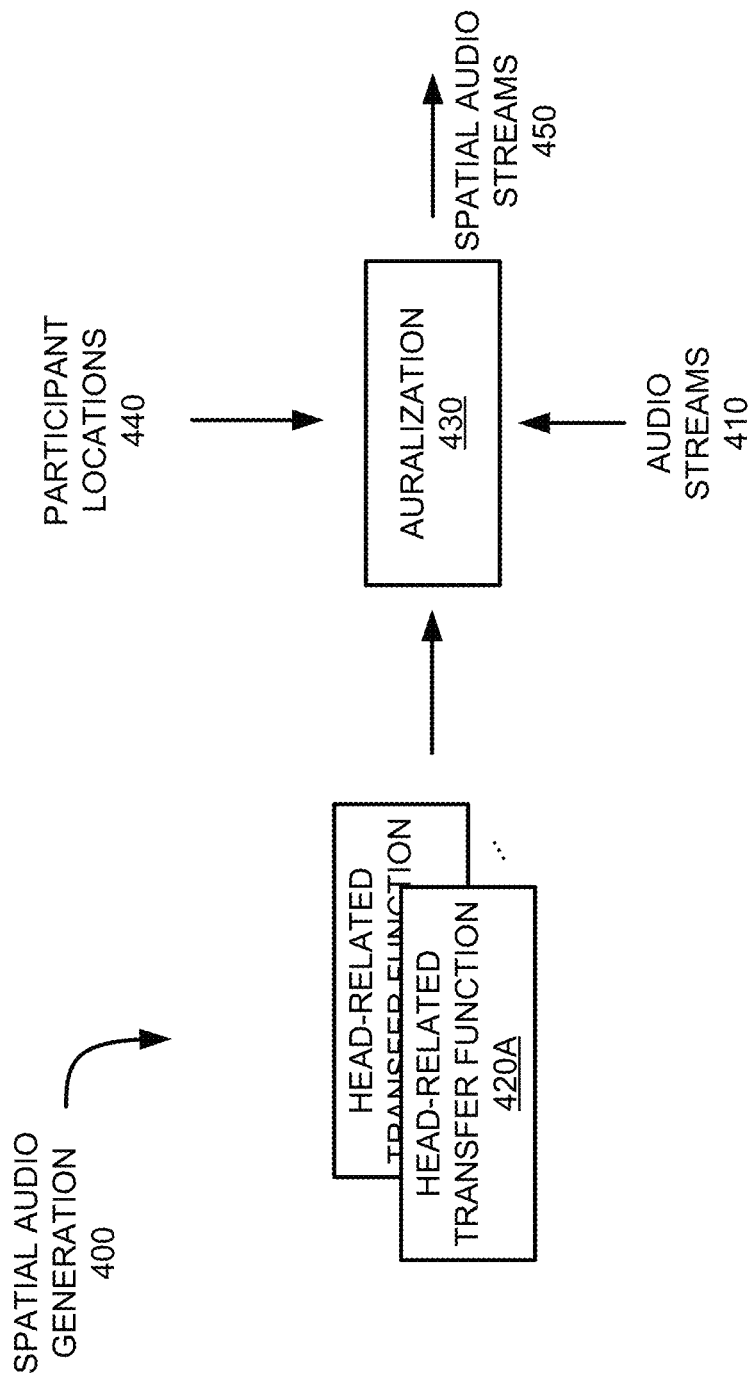
FIG. 4 shows an example mingling audio system suitable for use with example systems and methods of spatial audio in virtual conference mingling.

Referring now to FIG. 4, FIG. 4 shows an example mingling audio system 400 suitable for use with various example systems and methods for spatial audio in virtual conference mingling, such as in the mingling audio system 352 shown in FIG. 3B. The mingling audio system 400 receives input audio streams 410 and participant locations 440, or locations of groups that participants have joined. It then selects one HRTF for each input audio stream based on the relative location between the participant and the group that was the source of the particular input audio stream. The auralization system 430 then generates spatialized audio streams from that input audio stream by convolving the input audio stream with the corresponding HRTF.

Convolving an audio stream with an HRTF changes the apparent location of the sound source with respect to the user. Each HRTF in a set adjusts input audio based on the virtual location of a particular audio source with respect to the listener. In some examples, the selection of HRTFs can also be changed based on the pose of the listener's head. Thus, depending on the location of an audio source with respect to the listener (and potentially based on the listener's head pose), a particular HRTF can be selected from the set of HRTFs and used to generate spatialized audio streams for the listener.

Each HRTF in a set of HRTFs can be generated according to any suitable technique. For example, they can be generated empirically by positioning microphones at the entrance of a person's ear canals and playing exciting signals at various locations within a space. The received sound at each microphone, as well as the sound source, can then be used to calculate the HRTF. By moving the sound source to different locations, multiple different HRTFs can be generated. Further, HRTFs can be interpolated for locations between the empirically generated HRTFs using any suitable interpolation technique. For example, spherical harmonics can be used for HRTF interpolation, such as by using the following spherical harmonic basis functions:

$$Y_{nm}(\phi, \theta) = \sqrt{\frac{(2n+1)}{4\pi}} P_n^m(\sin(\theta)), \text{ for } m = 0 \tag{1}$$

$$Y_{nm}(\phi, \theta) = \sqrt{\frac{(2n+1)}{2\pi} \frac{(n-|m|)!}{(n+|m|)!}} P_n^m(\sin(\theta))\cos(m\phi), \text{ for } m > 0$$

$$Y_{nm}(\phi, \theta) = \sqrt{\frac{(2n+1)}{2\pi} \frac{(n-|m|)!}{(n+|m|)!}} P_n^{|m|}(\sin(\theta))\sin(|m|\phi), \text{ for } m < 0$$

In the equation above, $P_n^m$ represents the associated Legendre polynomial of order n and degree m. An arbitrary continuous spherical function $f(\phi, \theta)$ can be expanded as:

$$f(\phi, \theta) = \sum_{n=0}^{P} \sum_{m=-n}^{n} Y_{nm}(\phi, \theta) C_{nm} \qquad (2)$$

In the equation above, $C_{nm}$, is the spherical harmonic coefficients. For arbitrary measurement grids, the spherical harmonic coefficients can be obtained by least-squares estimation:

$$\hat{c} = (Y^T Y)^{-1} Y^T f, \text{ given } f = Yc \qquad (3)$$

By obtaining the spherical harmonic coefficients, HRTFs can be interpolated in arbitrary spatial directions by feeding the coefficients into the equation (2) above. Alternatively, HRTFs can be generated based on acoustic simulation or statistical modeling methods.

The mingling audio system 352 obtains one or more sets of HRTFs, such as from the virtual conference provider 310 or they may be pre-installed with the mingling audio system 352.

The auralization system 430 selects an HRTF corresponding to the location for a particular received audio stream, or it interpolates an HRTF at a specific location. It then applies the selected HRTF to the input audio stream and generates spatial audio streams. In this example, the auralization system 430 generates two spatial audio streams for each input stream, each spatial audio stream corresponding to one of a left or right audio channel. As a result, the participant will perceive the outputted spatial audio streams as originating from the other participant's location.

Referring again to FIG. 3B, as the client device 330 receives incoming audio streams during a virtual conference, it provides the audio streams to the virtual conferencing application 350, which in turn provides them to the mingling audio system 352 along with information identifying the sources of the audio streams and their respective locations within the virtual conference area. The mingling audio system 352 employs the mingling audio system, such as mingling audio system 400, to generate spatialized audio streams for one or more of the received audio streams. Then the spatialized audio streams are combined together and output by speakers 338a-b connected to the client device, such as headphones or desktop speakers.

By generating and outputting the spatialized audio streams, the user of the client device 330 perceives them coming from different spatial locations corresponding to different audio sources, such as another participant or group of participants within the virtual conference area. This can provide the user with the sense of being present within the virtual conference area and being among a group of people having their respective discussions.

Referring now to FIGS. 5A-5F, FIG. 5A shows an example GUI 500 for a software client that can interact with a system for providing spatial audio in virtual conference mingling. A client device, e.g., client device 330 or client devices 340a-n, executes a software client as discussed above, which in turn displays the GUI 500 on the client device's display. In this example, the GUI 500 includes a speaker view window 502 that presents the current speaker in the virtual conference. Above the speaker view window 502 are smaller participant windows 504, which allow the participant to view some of the other participants in the virtual conference, as well as controls ("<" and ">") to let the host scroll to view other participants in the virtual conference. On the right side of the GUI 500 is a chat window 540 within which the participants may exchange chat messages.

Beneath the speaker view window 502 are a number of interactive elements 510-530 to allow the participant to interact with the virtual conference software. Controls 510-512 may allow the participant to toggle on or off audio or video streams captured by a microphone or camera connected to the client device. Control 520 allows the participant to view any other participants in the virtual conference with the participant, while control 522 allows the participant to send text messages to other participants, whether to specific participants or to the entire meeting. Control 524 allows the participant to share content from their client device. Control 526 allows the participant toggle recording of the meeting, and control 528 allows the user to select an option to join a breakout room. Control 530 allows a user to launch an app within the virtual conferencing software, such as to access content to share with other participants in the virtual conference. In addition to controls 510-530, a virtual conference mingling button 532 is provided by the GUI 500 which allows the user to configure the virtual meeting as a mingling-style conference.

Figure 5A:
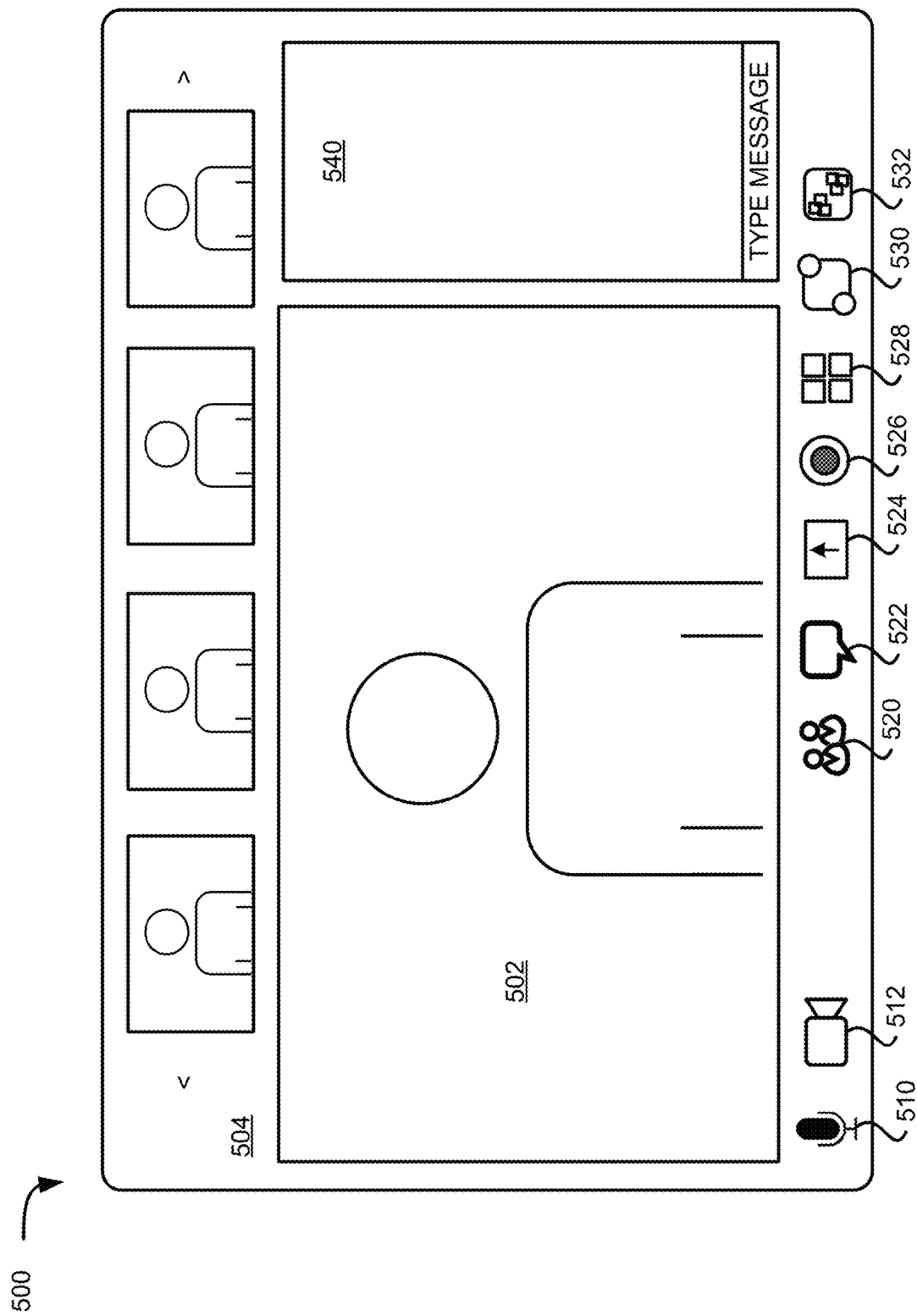
FIGS. 5A-5F show an example graphical user interface usable with systems and methods for spatial audio in virtual conference mingling.
Figure 5B:
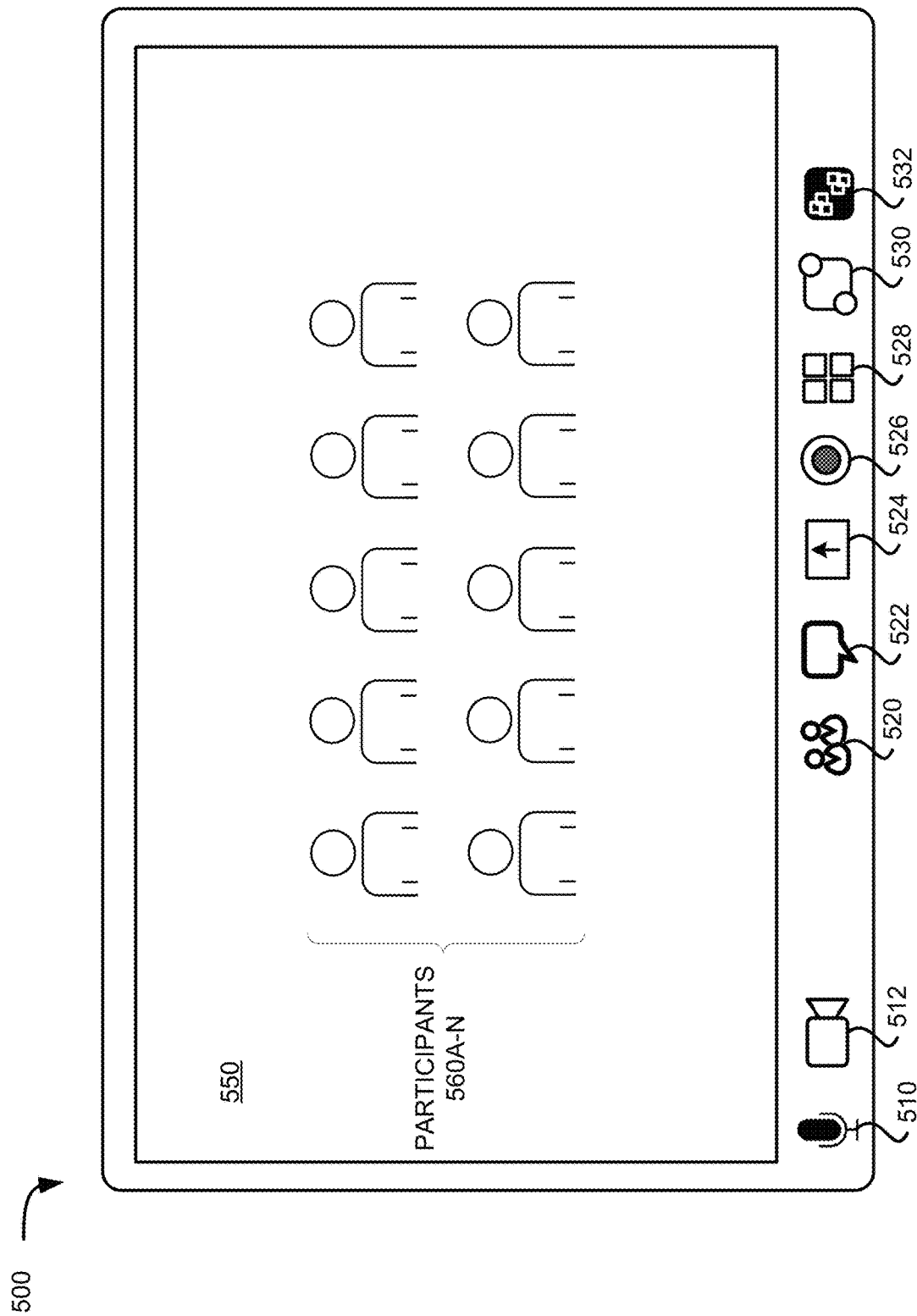

Referring now to FIG. 5B, FIG. 5B illustrates the GUI 500 after the user has selected the virtual conference mingling button 532, which has been highlighted to indicate that a mingling-style conference is active. In response to selecting the virtual conference mingling button 532, the user's client device 330 (in this case the host of the virtual conference) transmits an indication to the virtual conference provider 310 to convert the meeting to a mingling-style conference. The virtual conference provider 310 then establishes a virtual conference area 550 and places each participant 560a-n at a respective location within the virtual conference area 550. In this example, the virtual conference provider 310 has initially positioned the participants 560a-n in two rows, but any other approach may be used, including arranging the participants 560a-n in a circle or randomly distributed within the virtual conference area 550. In the cases when the participants are not presents as avatars, there might be multiple empty rooms created for mingling. The participants can easily join one of those rooms to mingle with other participants in that room and at the same time they could hear the sound coming from other rooms.

After positioning the participants 560a-n within the virtual conference area 550, the virtual conference provider transmits an indication to the participants in the virtual conference that the conference has been converted to a mingling-style conference and also transmits indications of the participants 560a-n locations to the client devices 330, 340a-n that are connected to the virtual conference. In response to receiving the indications, the client software executed by the various client devices 330-340a-n changes the GUI 500 to remove the different participant windows 502, 504 and the chat window 540, and instead provides a virtual conference area 550 and places avatars for each of the participants 560a-n within the virtual conference area 550 according to their assigned positions. In this example, the avatars are video feeds corresponding to the respective participants so that the various participants 560*a-n* can still see each of the other participants video feeds; however, in some examples, the avatars may be stylized representations of the participants, such as silhouettes or other images. In some examples, the avatar for a participant may change to a video feed if another participant moves into close proximity so that that the two can see each other, but more distant participants may only see the stylized representations. This may provide some privacy for participants who are engaged in a conversation.

After the GUI 500 has changed to show the virtual conference area 550, participants 560*a-n* may move around the virtual conference area 550 by providing inputs to their client device 330, 340*a-n*, such as by pressing one or more keys on a keyboard (e.g., arrow keys), selecting and dragging their avatar with a mouse or a touch gesture, or using any other suitable input device or GUI element, such as displayed directional arrows.

In this example, all of the participants were connected and sharing multimedia streams via a virtual conference that included a main meeting, which all participants were connected to. After transitioning to the mingling-style virtual conference, the participants remain connected to the main meeting, but as they move around the virtual conference area 550, they may leave the main meeting, while remaining connected to the virtual conference. If they move near to another participant, they may establish a sub-meeting and begin to exchange multimedia streams so they can converse with each other. If the participants are presented virtually, they can choose to join some sub-meetings by clicking some areas which may be presented by boxes or other shapes. Thus, participants can organically move from the main meeting into sub-meetings with other participants, simply by moving around the virtual conference area 550 or directly choosing a sub-meeting to join. In some examples, participants may already be distributed between a main meeting and one or more sub-meetings. If the meeting is then configured to be a mingling-style meeting in a virtual conference area 550, the participants may be initially grouped according to the meeting or sub-meeting they were participating in.

Figure 5C:
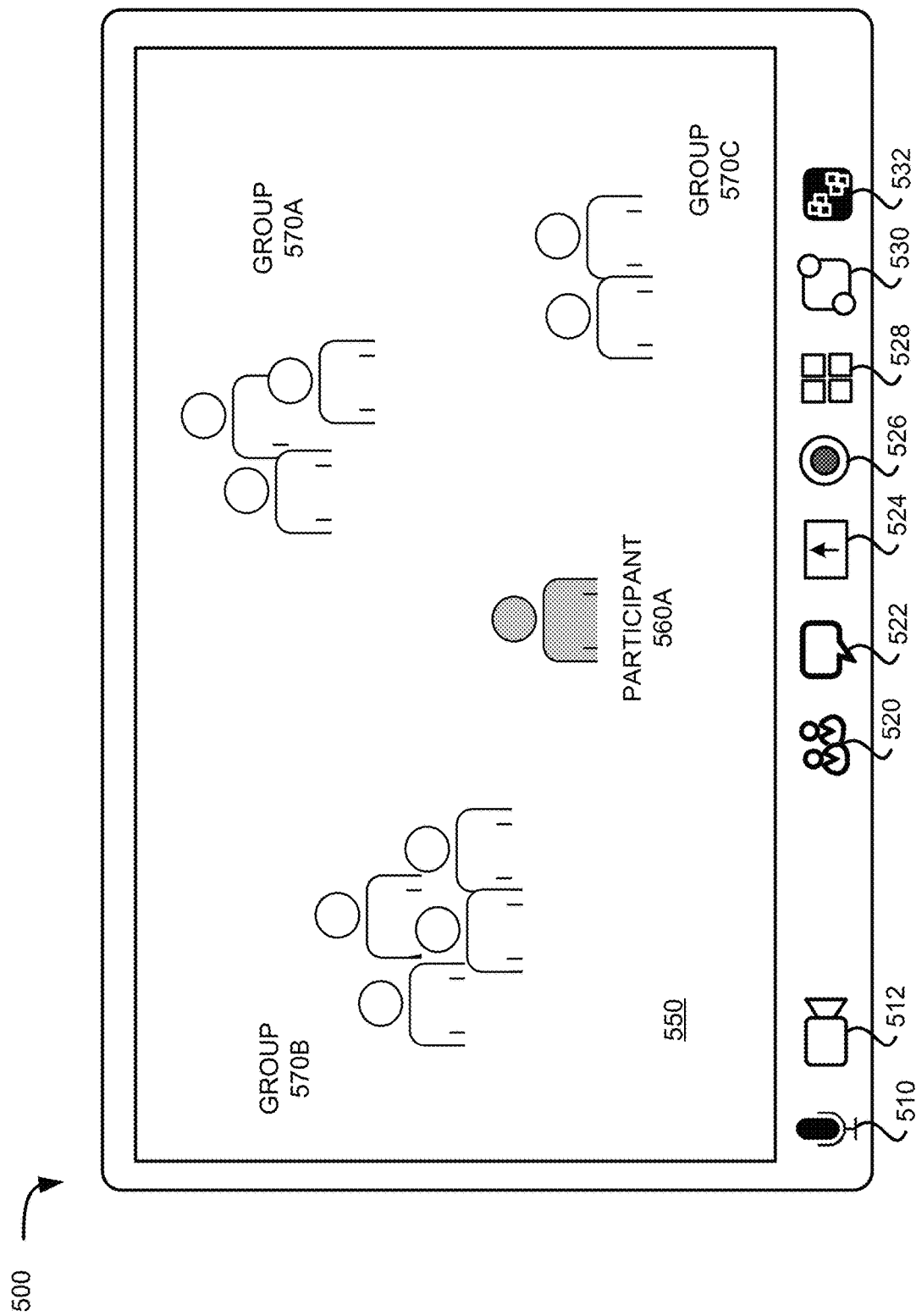

Referring now to FIG. 5C, FIG. 5C illustrates the virtual conference area 550 after the participants 560*a-n* have moved within the virtual conference area 550 and established several different groups 570*a-c*. Each of the different groups 570*a-c* provides a discrete meeting for its participants, thus the participants in group 570*a* are in a different meeting of the virtual conference than the participants in groups 570*b*, 570*c*. Thus, participants in those groups are able to hear and see the participants in their group but may not be able to hear but still see the participants in the other groups. Though in some examples, a participant is able to hear participants in other groups via spatialized audio streams after a participant has joined a group, which is exactly like their experience in a real-life networking event.

A participant, such as participant 560*a*, who is not in any group is able to hear the conversations occurring in the different groups 570*a-c* as though they were walking amongst different groups of people, such as at a networking event. Thus, their client device, e.g., client device 340*a*, receives and outputs audio streams from the various groups 570*a-c* in the conference. In addition, their client device 340*a* employs a mingling audio system 400 that provides spatialized audio streams based on the streams received from the different participants or groups. Thus, while "standing" at the location shown in FIG. 5C, the participant 560*a* hears audio from group 570*a*, which sounds like it is coming from in front of them and slightly to their right, while audio from group 570*c* sounds like it is coming from their right and slightly behind them. Finally, the audio from group 570*b* sounds like it is coming from their left and front. Since the three groups 570*a-c* are roughly the same distance from the participant 560*a*, they will likely all have similar volumes, however, as the participant approaches a group, its volume may increase, based on the magnitude of the corresponding HRTF. As the participant 560*a* moves within the virtual conference area 550, the relative positions of the participant 560*a* and the groups 570*a-c* changes, causing the mingling audio system 400 to select different HRTFs for processing incoming audio streams based on the relative positions of the participant 560*a* and the groups 570*a-c*, thereby changing the spatialized audio streams output to the user.

Figure 5D:
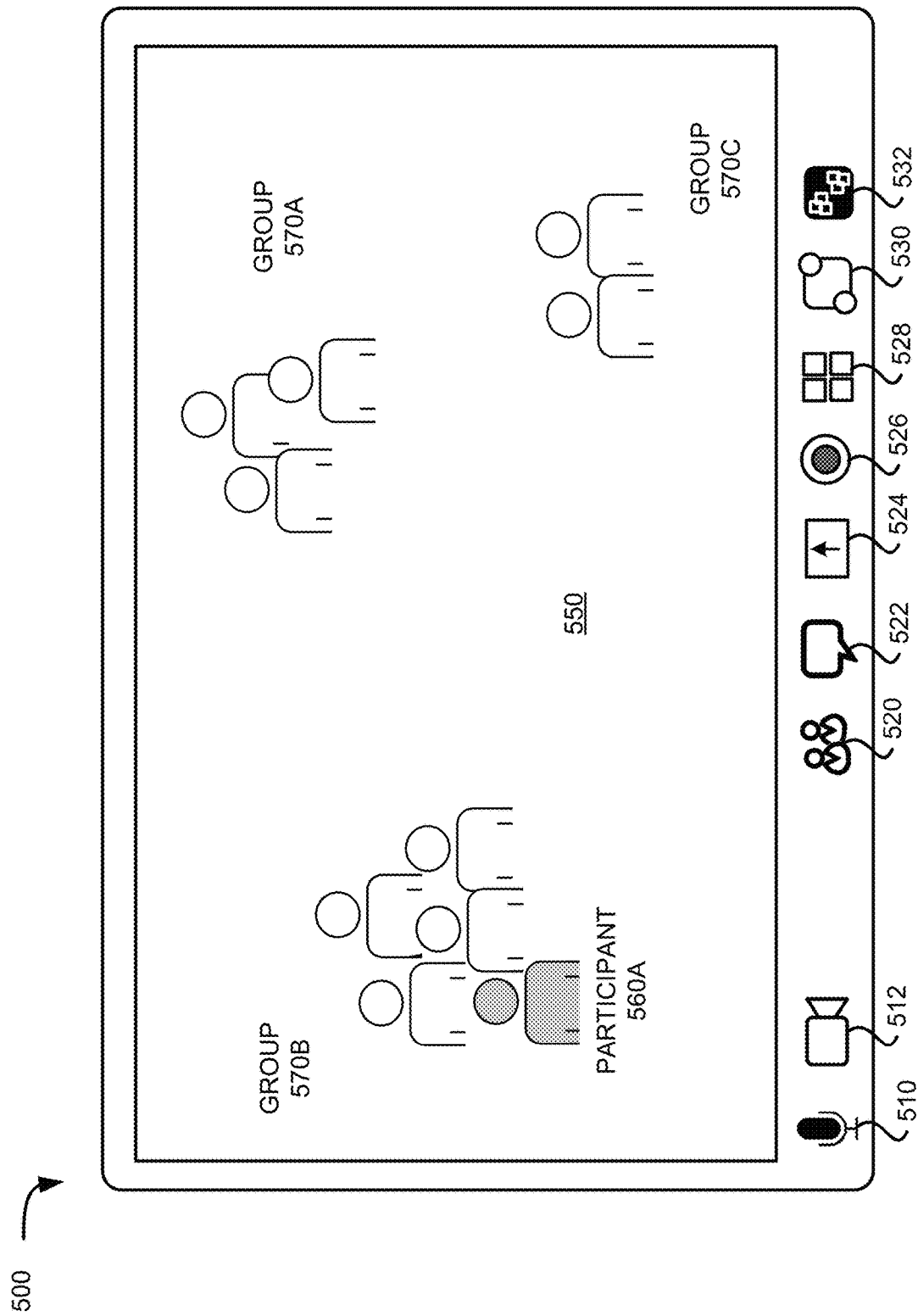

In FIG. 5D, the participant 560*a* has moved near to group 570*b*. Thus, the mingling audio system 400 provides high volume audio from the group 570*b*, because the near-field HRTF which is directly in front of the participant is used. The other groups 570*a,c* will sound as if they are more distant and to the participant's right. At some point, the participant 560*a* may move near enough to the group 570*b* that the virtual conference provider 310 determines a proximity threshold has been satisfied and joins the participant 560*a* to the group 570*b*. At that time, the participant 560*a* may no longer received spatialized audio streams from the other groups 570*a,c* and instead may focus their attention on the group 570*b* that they have joined. Similarly, if the participant 560*a* moves far enough away from the group 570*b*, the virtual conference provider 310 may determine that another proximity threshold has been satisfied and disconnect the participant 560*a* from the group 570*b*. At that time, the participant 560*a* may again begin receiving spatialized audio streams from the mingling audio system 400 as they move around within the virtual conference area 550.

Figure 5E:
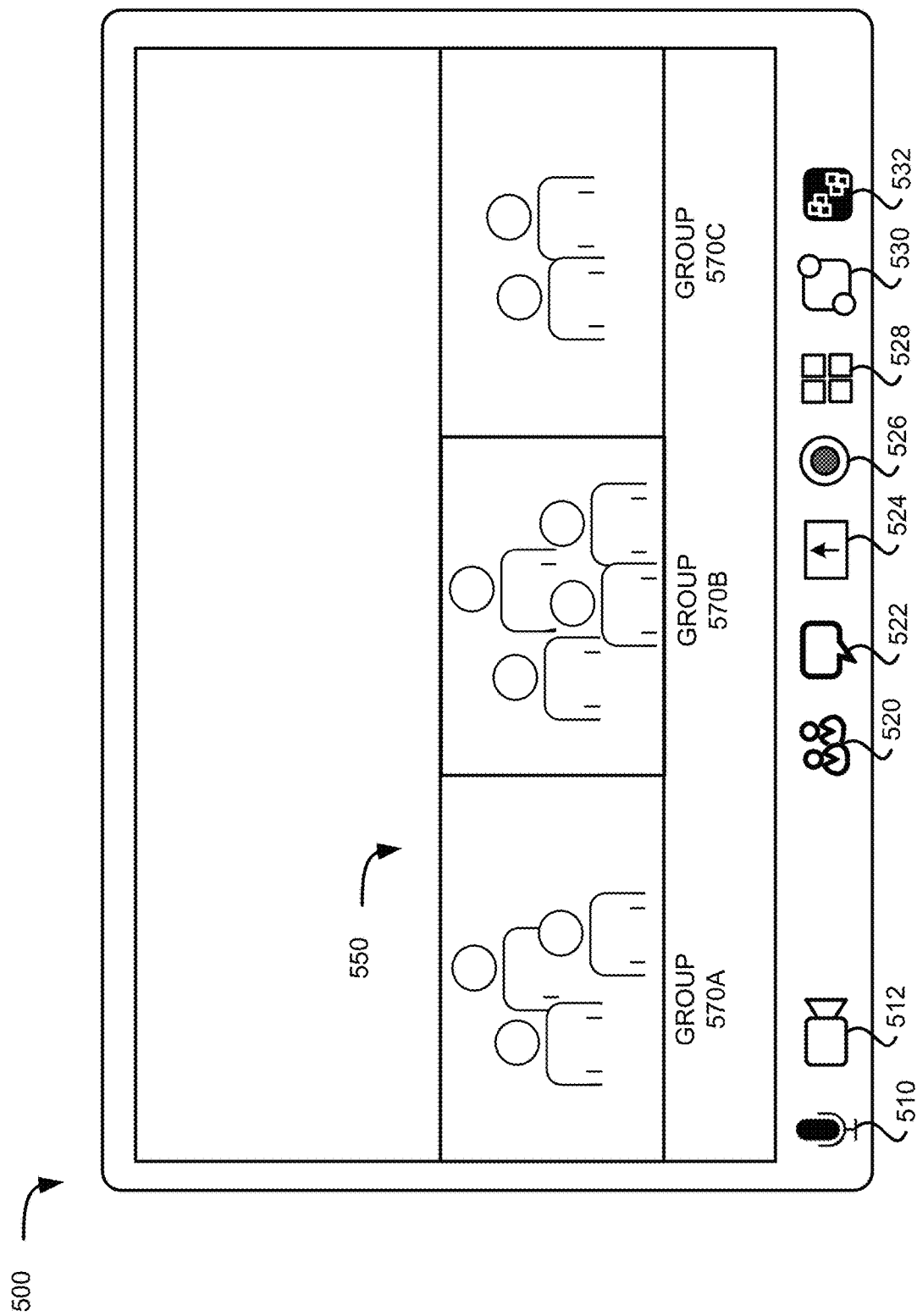

Referring now to FIG. 5E, FIG. 5E shows the GUI 500 with a different spatial representation of the available groups 570*a-c* in the virtual conference. In this example, the virtual conference area 550 is represented by a horizontal, scrollable list of the available groups 570*a-c* within separate blocks in the list. The user may use inputs, such as arrow key presses or dragging gestures with a mouse or touch input, to scroll through the available groups 570*a-c* in the virtual conference. Audio from some or all of the available groups may be output to the user based on the location of the respective group in within the virtual conference area 550. For example, in the configuration shown in FIG. 5E, group 570*b* is presented in the center of the virtual conference area 550 with respect to the user's assigned location, which is at the center of the virtual conference area 550. Thus, appropriate HRTFs for group 570*b* may be selected and the audio output from the group 570 may sound as if it comes from directly in front of the user. Similarly, spatialized audio for other two groups 570*a, c* will be generated using HRTFs selected from a group of available HRTFs based on the groups' respective locations with respect to the user's assigned location. Thus, group 570*a* will generate sound as if they are near to the participant and to their left, while group 570*c* will generate sound as if they are near to the participant and to their right. Once the user has identified a group of interest, they may then select the group to join it.

If more groups were present within the virtual conference area 550, spatialized audio would be generated for some or all of those groups, depending on their apparent location with respect to the user's assigned location. Groups that have been scrolled off-screen may not have spatialized audio generated for them, in some examples, though some examples continue to generate spatialized audio for groups within a threshold distance of the user's assigned location or for all available groups.

Figure 5F:
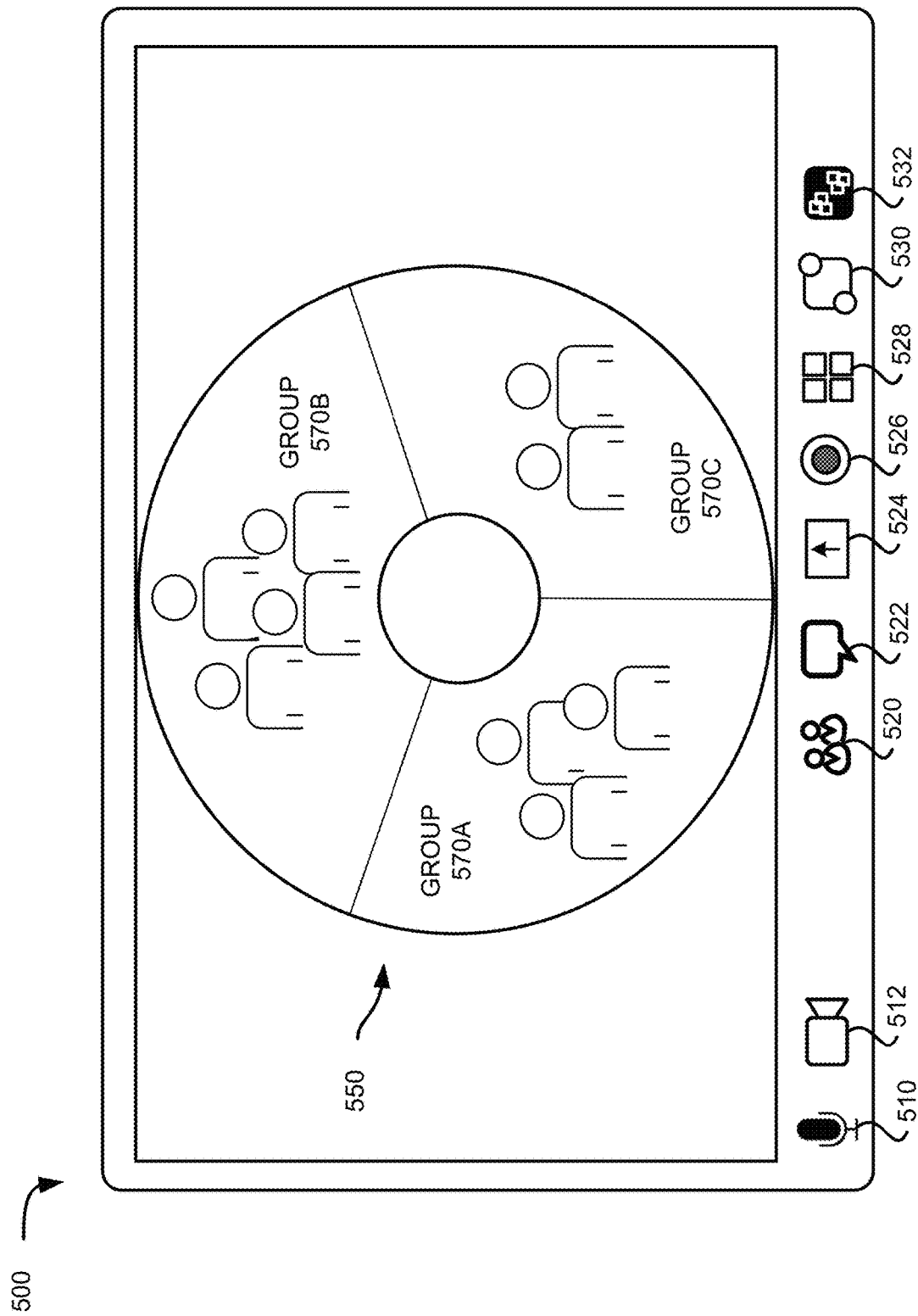

Referring to FIG. 5F, the GUI 500 presents another layout for the groups present within the virtual conference. Similar to the example discussed above with respect to FIG. 5E, the groups have been arrayed within a virtual conference area configured as a circular scrollable list of blocks. The user may rotate the listing using similar inputs to those discussed above with respect to FIG. 5E. As with the example in FIG. 5E, spatialized audio streams for one or more groups are generated based on each groups' respective location with respect to the user's assigned location, which in this example is at the center of the virtual conference area 550. Thus, spatialized audio from group 570b will sound as if it comes from directly in front of the user, while spatialized audio from groups 570a, c will sound as if it comes from the behind the user and to the left and right, respectively. As the user scrolls the list to the right or left, the respective locations of the groups rotate around the center and the apparent location of each spatialized audio stream changes based on the new locations of the groups and correspondingly selected HRTFs. As with the example in FIG. 5E, once the user has identified a group of interest, they may then select the group to join it. And while the examples shown in FIGS. 5E and 5F show horizontal and circular arrangements, other scrollable arrangements and orientations are within the scope of this disclosure, including vertical lists as well as square, triangular, or other shapes.

Figure 6:
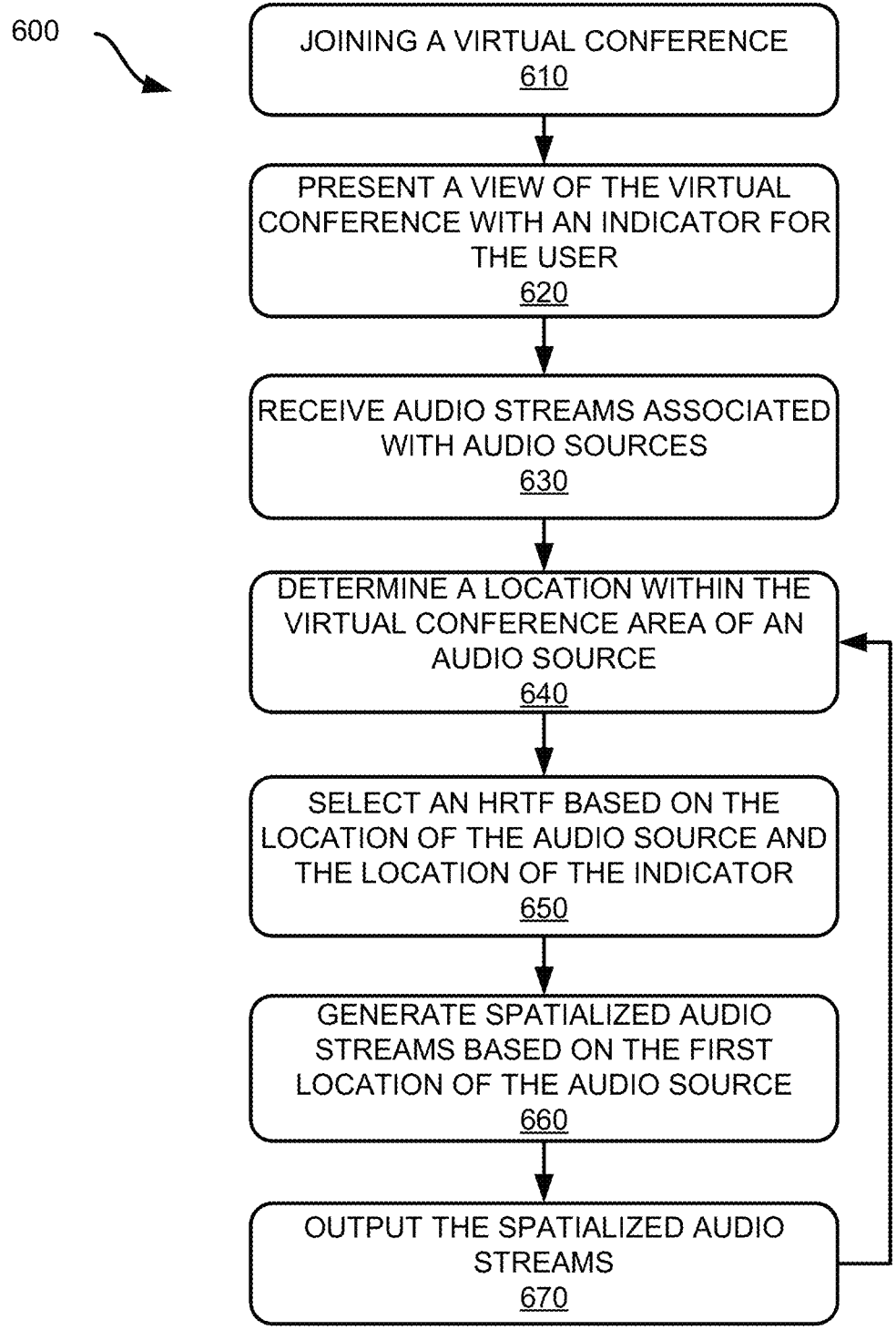
FIG. 6 shows an example method for spatial audio in virtual conference mingling.

Referring now to FIG. 6, FIG. 6 shows an example method for spatial audio in virtual conference mingling. The discussion with respect to FIG. 6 will be made with respect to the systems 300, 400 shown in FIGS. 3A-3B and 4 and the GUI 500 shown in FIGS. 5A-5C; however, any suitable system according to this disclosure may be employed, including the example systems 100-200 shown in FIGS. 1-2.

At block 610, a user uses client software 350 to join a virtual conference hosted by a virtual conference provider using a client device 330, generally as described above with respect to FIGS. 1-2 and 3A-3B. In this example, the user is the host of the virtual conference, but other participants in the virtual conference may join using client software 350 executed by their own respective client devices 340a-n as described above with respect to FIGS. 1-2 and 3A-3B.

At block 620, the client software 350 presents a view of a virtual conference hosted by a virtual conference provider 310 including multiple participants 560a-n to the user. In this example, the view of the virtual conference includes a view of a virtual conference area 550 in which multiple different participants 560a-n are located. Each participant 560a-n, including the user, is visually represented in the virtual conference area 550 by an indicator, such as an avatar or video feed. The various participants 560a-n can freely move within the virtual conference area 550 and can form different groups 570a-c within which they can have discussions. As discussed above, each grouping can be associated with a different meeting or sub-meeting of the virtual conference.

In some examples, however, the user may not be represented, such as in the example GUIs 500 shown in FIGS. 5E-5F. Instead, the user's location may be fixed and assigned to particular location. For example, in the example in FIG. 5E, the user's location within the virtual conference area 550 is assigned to be at the center of the horizontal listing of available groups, and in FIG. 5F, the user's location is assigned to be at the center of the circular listing of available groups. And while these examples do not show an avatar for the user, some examples may display such an avatar to provide a graphical representation of relative spatial positioning in addition to providing spatialized audio streams.

At block 630, the user's client device 330 receives one or more audio streams from the participants within the virtual conference area 550, generally as discussed above with respect to FIGS. 1-2.2

At block 640, the client application 350 determines a location within the virtual conference area of one or more of the received audio sources. Each of the received audio streams may be identified as originating from a corresponding participant. For example, the client software 350 may receive location information for the other participants in the virtual conference area, both to enable the client software to properly display the participants 560a-n in virtual conference area 550 and to enable generation of spatialized audio streams. Alternatively, the client application 350 may determine a location of one or more audio sources based on a particular group or meeting within the virtual conference that a corresponding participant has joined. For example, while each participant in the virtual conference may have an associated location, when participants collectively join a group, the group may be assigned a location by the virtual conference provider 310 (or by the client device) that is received instead of, or in addition to, the locations of the participants within the group. Providing a common location for a group of participants may reduce processing requirements on the client device because all of the audio streams from the group may be processed by the mingling audio system 400 as though they are co-located and thus may be used with the same selected HRTF. However, in some examples each participant's audio stream within a group may be associated with the participant's own location.

At block 650, the client software 350 selects an HRTF based on the location of an audio source with respect to the location of the user's indicator within the virtual conference area 550. As discussed above with respect to FIG. 4, the mingling audio system 400 employs HRTFs to generate spatialized audio streams based on the location of the audio source with respect to the user's location within the virtual conference area 550. Each of the HRTFs may be associated with particular locations relative to an origin point, which is set as the user's indicator location. These HRTFs may include near-field and far-field HRTFs which may be associated with different relative distances from the user that have been generated prior to the virtual conference and made accessible to the client software. Thus, each HRTF is associated with a hypothetical point in space with respect to the user's position and by determining the location of an audio source with respect to the user's location, an HRTF that most closely matches with that location can be selected. Alternatively, the client software 350 can interpolate an HRTF that provides a better match with the audio source's location based on HRTFs associated with nearby locations.

In some examples, the selection of HRTFs can also be made (or changed) based on the pose of the listener's head. For example, as the user's camera captures video images of the user, the client software 350 may employ a pose detection system to determine the pose of the user's head. The pose of the user's head may further be used to select an HRTF from a set of HRTFs or to select a set of HRTFs from multiple different sets of HRTFs (e.g., where sets of HRTFs are associated with different head poses). Thus, depending on the location of an audio source with respect to the listener and based on the listener's head pose, a particular HRTF can be selected from the set of HRTFs and used to generate spatialized audio streams for the listener.

Further, because, at any given time, the client device may receive audio streams from multiple different participants, an HRTF may be selected for each of these received audio streams, generally as discussed above.

At block 660, the mingling audio system 400 generates spatialized audio streams based on a received audio stream from another participant. As discussed above, the mingling audio system 400 employs an auralization system 430 to generate spatialized audio streams based on a received audio stream and a selected HRTF. The auralization system 400 convolves the audio stream with the HRTF to generate multiple spatial audio streams. Further, because multiple audio streams may have been received, the auralization system 400 may generate spatialized audio streams for some or all of the received audio streams.

If the auralization system 430 uses the same HRTF for multiple received audio streams, the mingling audio system 400 may first combine those multiple received audio streams before providing the single combined audio stream to the auralization system 430. If spatialized audio streams are generated from multiple received audio streams, the mingling audio system 400 may combine the generated spatialized audio streams into a single set of audio streams, e.g., left and right channels.

At block 670, the client device 330 outputs the spatialized audio streams to the user, such as via speakers 338a-b, which may be speakers placed on the user's desk or in the room with the user or that may be part of a headset worn by the user.

The method 600 may then return to block 640 as audio streams continue to be received from other participants within the virtual conference and as the participant moves within the virtual conference area 550. It should be appreciated that block 650 may only need to be performed once per other participant for as long as the user's position and the other participant's position does not change relative to each other. However, as participants move within the virtual conference area 550, then the mingling audio system 352 may perform block 650 multiple times based on the various participants movements.

In addition, in some examples, it may be the virtual conference provider 310 that has one or more mingling audio systems 352 on one or more servers operated by the virtual conference provider 310 that may be used instead of mingling audio systems 352 at the client devices 340a-n. In some such examples, the virtual conference provider 310 may provide audio streams received from the various participants in the virtual conference area to one or more of these remote mingling audio systems to generate spatial audio streams for participants in the virtual conference, similarly to the mingling audio system 352 executed by the video conferencing application 350. The spatialized audio streams may be generated for one or more of the participants, generally as described above with respect to FIGS. 3A-3B and 4, and the spatialized audio streams may then be streamed to those participants.

Figure 7:
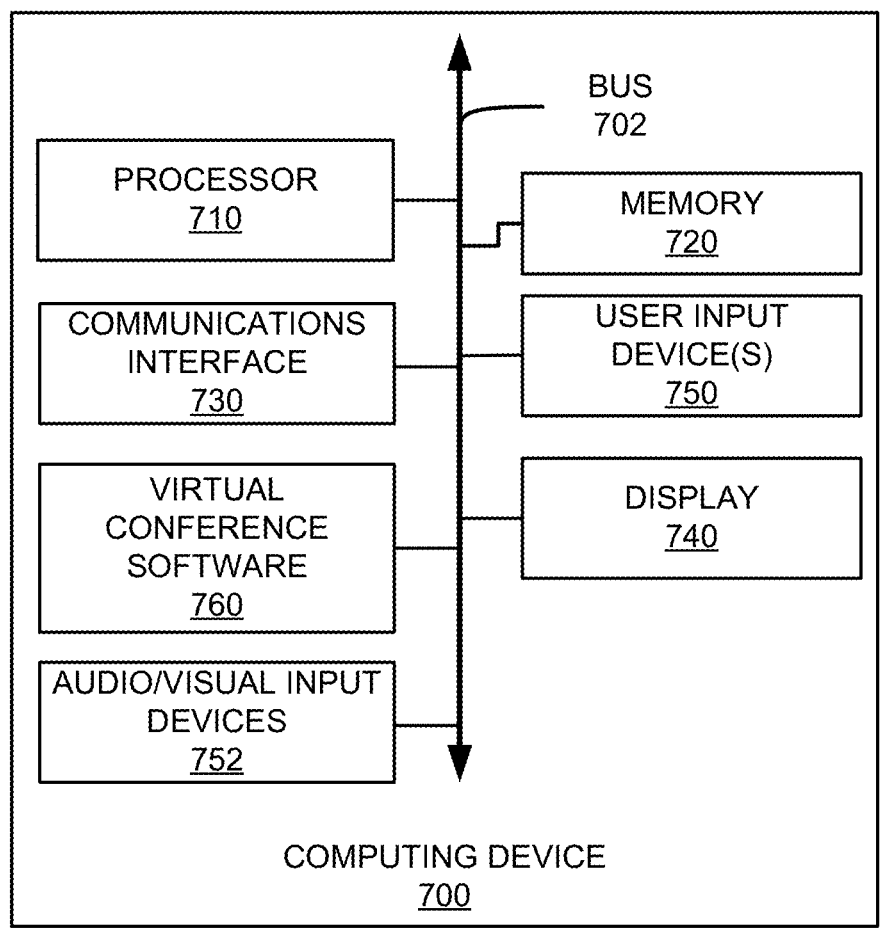
FIG. 7 shows an example computing device suitable for use with example systems and methods for spatial audio in virtual conference mingling.

Referring now to FIG. 7, FIG. 7 shows an example computing device 700 suitable for use in example systems or methods for spatial audio in virtual conference mingling according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for spatial audio in virtual conference mingling according to different examples, such as part or all of the example method 600 described above with respect to FIG. 6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes a virtual conferencing application 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 740. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
presenting, by a client device, a view of a virtual conference hosted by a virtual conference provider, the virtual conference including a plurality of participants, the client device associated with a participant of the plurality of participants, the view including a plurality of groupings of participants within a virtual conference area, each grouping associated with a different meeting or sub-meeting of the virtual conference;
assigning a location within the virtual conference area to the participant;
receiving, at the client device from the conference provider, one or more audio streams associated with one or more audio sources within the plurality of groupings, the one or more audio streams provided by one or more remote client devices;
determining a first location within the virtual conference area of a first audio source of the one or more audio sources;
generating a plurality of spatialized audio streams based on the first location of the first audio source, the location of the participant, and a first audio stream associated with the first audio source; and
outputting the spatialized audio streams.

2. The method of claim 1, further comprising:
selecting a head-related transfer function ("HRTF") from a set of HRTFs based on the first location of the first audio source and the location of the participant, and
wherein generating the plurality of spatialized audio streams is further based on the selected HRTF.

3. The method of claim 1, wherein the first audio source is associated with a first participant within a first grouping of the plurality of groupings, and further comprising:
determining a second location within the virtual conference area of a second audio source of the one or more audio sources, the second audio source associated with a second participant within a second grouping of the plurality of groupings; and
wherein generating the plurality of spatialized audio streams is further based on the location of the second audio source and the second audio stream associated with the second audio source.

4. The method of claim 3, further comprising:
selecting a first head-related transfer function ("HRTF") from a set of HRTFs based on the first location of the first audio source and the location of the participant,
selecting a second HRTF from a set of HRTFs based on the second location of the second audio source and the location of the participant, and
generating the plurality of spatialized audio streams is further based on the first and second HRTFs.

5. The method of claim 1, further comprising:
receiving, by the client device, an input changing the location of the participant;
updating the location of the participant based on the input;
generating a plurality of spatialized audio streams based on the first location of the first audio source, the updated location of the participant, and a first audio stream associated with the first audio source; and
outputting the spatialized audio streams.

6. The method of claim 1, wherein the participant is a member of a first grouping of the plurality of groupings and the first audio source is associated with a first participant within a second grouping of the plurality of groupings, and further comprising:
selecting a first head-related transfer function ("HRTF") from a set of HRTFs based on the first location of the first audio source and the location of the participant;
receiving a second audio stream from a second participant within the first grouping;
determining a second location with respect to the participant of a second audio source associated with the second participant within the first grouping;
selecting a second HRTF from a set of HRTFs based on the second location of the second audio source with respect to the participant; and
generating the plurality of spatialized audio streams is further based on the first and second HRTFs.

7. The method of claim 6, wherein the first HRTF is a far-field HRTF and the second HRTF is a near-field HRTF.

8. The method of claim 6, further comprising:
receiving, from a camera connected to the client device, a video stream;
determining a pose of the participant's head in the video stream; and
wherein selecting the first or the second HRTF is based on the pose of the participant's head.

9. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
present, by a client device, a view of a virtual conference hosted by a virtual conference provider, the virtual conference including a plurality of participants, the client device associated with a participant of the plurality of participants, the view including a plurality of groupings of participants within a virtual conference area, each grouping associated with a different meeting or sub-meeting of the virtual conference;
assign a location within the virtual conference area to the participant;
receive, from the conference provider, one or more audio streams associated with one or more audio sources within the plurality of groupings, the one or more audio streams provided by one or more remote client device;
determine a first location within the virtual conference area of a first audio source of the one or more audio sources;
generate a plurality of spatialized audio streams based on the first location of the first audio source, the location of the participant, and a first audio stream associated with the first audio source; and
output the spatialized audio streams.

10. The system of claim 9, wherein the one or more processors are configured to execute further processor-executable instructions stored in the non-transitory computer-readable medium to:
select a head-related transfer function ("HRTF") from a set of HRTFs based on the first location of the first audio source and the location of the participant, and
generate the plurality of spatialized audio streams further based on the selected HRTF.

11. The system of claim 9, wherein the first audio source is associated with a first participant within a first grouping of the plurality of groupings, and wherein the one or more processors are configured to execute further processor-executable instructions stored in the non-transitory computer-readable medium to:
determine a second location within the virtual conference area of a second audio source of the one or more audio sources, the second audio source associated with a second participant within a second grouping of the plurality of groupings; and
generate the plurality of spatialized audio streams further based on the location of the second audio source and the second audio stream associated with the second audio source.

12. The system of claim 11, wherein the one or more processors are configured to execute further processor-executable instructions stored in the non-transitory computer-readable medium to:
select a first head-related transfer function ("HRTF") from a set of HRTFs based on the first location of the first audio source and the location of the participant,
select a second HRTF from a set of HRTFs based on the second location of the second audio source and the location of the participant, and
generate the plurality of spatialized audio streams is further based on the first and second HRTFs.

13. The system of claim 9, wherein the one or more processors are configured to execute further processor-executable instructions stored in the non-transitory computer-readable medium to:
receive an input changing the location of the participant;
update the location of the participant based on the input;
generate a plurality of spatialized audio streams based on the first location of the first audio source, the updated location of the participant, and a first audio stream associated with the first audio source; and
output the spatialized audio streams.

14. The system of claim 9, wherein the participant is a member of a first grouping of the plurality of groupings and the first audio source is associated with a first participant within a second grouping of the plurality of groupings, and wherein the one or more processors are configured to execute further processor-executable instructions stored in the non-transitory computer-readable medium to:
select a first head-related transfer function ("HRTF") from a set of HRTFs based on the first location of the first audio source and the location of the participant;
receive a second audio stream from a second participant within the first grouping;
determine a second location with respect to the participant of a second audio source associated with the second participant within the first grouping;
select a second HRTF from a set of HRTFs based on the second location of the second audio source with respect to the participant; and
generate the plurality of spatialized audio streams is further based on the first and second HRTFs.

15. The system of claim 14, wherein the first HRTF is a far-field HRTF and the second HRTF is a near-field HRTF.

16. The system of claim 14, wherein the system further comprises a camera, and wherein the one or more processors are configured to execute further processor-executable instructions stored in the non-transitory computer-readable medium to:
receive, from the camera, a video stream;
determining a pose of the participant's head in the video stream; and
select the first or the second HRTF further based on the pose of the participant's head.

17. A non-transitory computer-readable medium comprising processor-executable instructions configured to cause one or more processors to:
present, by a client device, a view of a virtual conference hosted by a virtual conference provider, the virtual conference including a plurality of participants, the client device associated with a participant of the plurality of participants, the view including a plurality of groupings of participants within a virtual conference area, each grouping associated with a different meeting or sub-meeting of the virtual conference;
assign a location within the virtual conference area to the participant;
receive, from the conference provider, one or more audio streams associated with one or more audio sources within the plurality of groupings, the one or more audio streams provided by one or more remote client device;
determine a first location within the virtual conference area of a first audio source of the one or more audio sources;
generate a plurality of spatialized audio streams based on the first location of the first audio source, the location of the participant, and a first audio stream associated with the first audio source; and
output the spatialized audio streams.

18. The non-transitory computer-readable medium of claim 17, further comprising processor-executable instructions configured to cause one or more processors to:
select a head-related transfer function ("HRTF") from a set of HRTFs based on the first location of the first audio source and the location of the participant, and
generate the plurality of spatialized audio streams further based on the selected HRTF.

19. The non-transitory computer-readable medium of claim 17, wherein the first audio source is associated with a first participant within a first grouping of the plurality of groupings, and further comprising processor-executable instructions configured to cause one or more processors to:
- determine a second location within the virtual conference area of a second audio source of the one or more audio sources, the second audio source associated with a second participant within a second grouping of the plurality of groupings; and
- generate the plurality of spatialized audio streams further based on the location of the second audio source and the second audio stream associated with the second audio source.

20. The non-transitory computer-readable medium of claim 19, further comprising processor-executable instructions configured to cause one or more processors to:
- select a first head-related transfer function ("HRTF") from a set of HRTFs based on the first location of the first audio source and the location of the participant,
- select a second HRTF from a set of HRTFs based on the second location of the second audio source and the location of the participant, and
- generate the plurality of spatialized audio streams further based on the first and second HRTFs.

\* \* \* \* \*